US006611600B1

(12) United States Patent
Leber et al.

(10) Patent No.: US 6,611,600 B1
(45) Date of Patent: Aug. 26, 2003

(54) CIRCUIT AND METHOD FOR THE ADAPTIVE SUPPRESSION OF AN ACOUSTIC FEEDBACK

(75) Inventors: Remo Leber, Bubikon (CH); Arthur Schaub, Wolfhausen (CH)

(73) Assignee: Bernafon AG, Bern (CH)

( * ) Notice: Subject to any disclaimer, the term of this patent is extended or adjusted under 35 U.S.C. 154(b) by 0 days.

(21) Appl. No.: 09/228,355

(22) Filed: Jan. 11, 1999

(30) Foreign Application Priority Data

Jan. 14, 1998 (CH) ............................................. 0064/98

(51) Int. Cl.[7] ................................................. H04B 3/20

(52) U.S. Cl. ........................... 381/66; 381/93; 381/318; 379/406.08

(58) Field of Search .......................... 381/66, 93, 71.11, 381/71.12, 312, 317, 318; 379/406.08, 406.01, 406.05, 406.06

(56) References Cited

U.S. PATENT DOCUMENTS

| | | |
|---|---|---|
| 5,259,033 A | 11/1993 | Goodings et al. |
| 5,619,580 A | 4/1997 | Hansen |
| 5,661,814 A | 8/1997 | Kälin et al. |
| 5,680,467 A | 10/1997 | Hansen |
| 5,991,418 A * | 11/1999 | Kuo ........................ 381/71.11 |

OTHER PUBLICATIONS

M. Mboup et al., "Coupled Adaptive Prediction & System Identification: A Statistical Model and Transient Analysis," Proceedings 1992 IEEE ICASSP, vol. 4; pp. 1–4 (1992).

S. Thomas Alexander, *Adaptive Signal Processing*, Chap. 7: Gradient Adaptive Lattice Methods, pp. 99–110 (Springer–Verlag, New York, 1986).

* cited by examiner

*Primary Examiner*—Ping Lee

(57) ABSTRACT

A circuit for adaptive suppression of acoustic feedback forms part of a digital hearing aid, comprising a microphone (1), subtracter (3), hearing correcting means (4), receiver (6), delay element (9), filter (10), updating unit (11), lattice decorrelators (12, 13) and control unit (14). The transmission path is modeled with the feedback characteristic (7) and an adder (8). First decorrelator (12) decorrelates the echo-compensated input signal (en) and second decorrelator (13) decorrelates the delayed output signal ($x_n$) by using coefficients ($k_n$) from first decorrelator (12). The coefficients ($k_n$) of the two filters (12, 13) are calculated by adaptive decorrelation of the echo-compensated input signal ($e_n$). This permit maximum convergence rates for minimum distortions. Updating of the filter coefficients mainly takes place where the greatest amplifications occur in the hearing correcting means (4). The fed-back signal components are continuously removed from the input signal.

15 Claims, 12 Drawing Sheets

CIRCUIT AND METHOD FOR THE ADAPTIVE SUPPRESSION OF AN ACOUSTIC FEEDBACK

FIELD OF THE INVENTION

Figure 1:
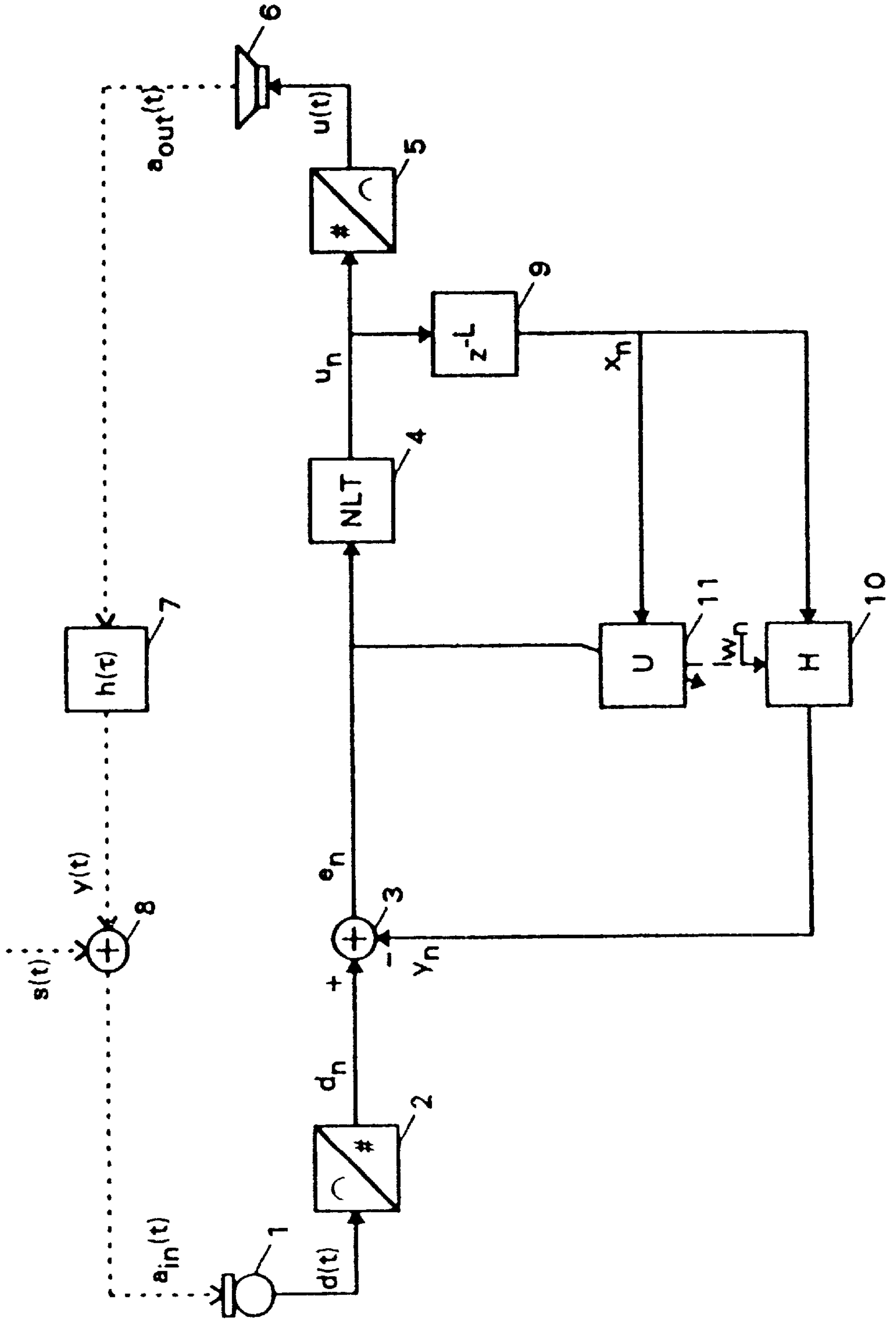
FIG. 1 PRIOR ART

The present invention relates to a circuit and a method for the adaptive suppression of an acoustic feedback. It is e.g. used in digital hearing aids.

BACKGROUND

In acoustic systems with a microphone, a loudspeaker or a receiver and an interposed electronic signal processing part, acoustic feedback can occur between the loudspeaker or receiver on the one hand and the microphone on the other. Acoustic feedback gives rise to undesired distortions and in extreme cases leads to an unstable behaviour of the system, e.g. an unpleasant whistling. As unstable operation is unacceptable, the signal amplification of the signal processing part must often be set lower than is effectively desired.

The suppression of acoustic feedback in digital hearing aids can be fundamentally combatted with different approaches. At present, the best results are obtained with the adaptive filtering method.

Various systems with adaptive filtering are known. In such systems an acoustic input signal is recorded, converted into a digital, electric signal and an echo estimate is deducted. The echo-compensated signal is transformed with a necessary hearing correcting means into a digital output signal, converted into an analog, electric signal and is emitted as an acoustic output signal. On its way back to the microphone the acoustic signal is shaped in accordance with a feedback characteristic and is superimposed on an acoustic signal from the outside to give a new, acoustic input signal. For calculating the echo estimate the fixed delays contained in the system are simulated and the unknown feedback characteristic is modelled.

Such generally known systems with adaptive filtering are unfortunately inadequate for obtaining in a realistic environment a low distortion transmission with satisfactory convergence behavior at the same time. The difficulties result from the fact that real signals, such as speech or music, have a not to be ignored autocorrelation function. The adaptive filter interprets the autocorrelation of the signal as a feedback effect and this leads to a partial extinction of the desired signal. In extreme cases this effect occurs with purely periodic signals (e.g. with alarm sounds). The system can be improved if the feedback characteristic is modelled using decorrelated signals. Different approaches exist for this and will be explained hereinafter.

A first approach involves the use of an artificial noise signal. Such a system is e.g. known from European patent applications EP-415 677, EP-634 084, EP-671 114 and corresponding U.S. Pat. Nos. 5,259,033, 5,680,467 and 5,619,580, respectively, of GN Danavox AS. The common characteristic of such systems is the use of an artificial noise signal for decorrelating the signals. The noise signal is either only connected in when required in place of the output signal or is continuously added to the output signal. The disadvantage of such systems is the necessary expenditure for the control of the noise signal power in such a way that the noise remains as inaudible as possible and despite this a sufficiently good convergence rate can be obtained.

A second approach involves the use of fixed, orthogonal transformations. Such a system of Phonak AG was e.g.

published as European patent application EP585 976 and U.S. Pat. No. 5,661,814. The common characteristic of such systems is the use of fixed, orthogonal transformations for the decorrelation of signals. The filtering and updating of the coefficients does not take place directly in the time domain in such systems. Apart from the generally greater computing expenditure, the disadvantage of such systems is the additional delay in the signal processing path resulting from the blockwise processing.

A third approach involves the use of adaptive decorrelation filters. Such a system was e.g. described by Mamadou Mboup et al "Coupled Adaptive Prediction and System Identification: A Statistical Model and Transient Analysis", Proc. 1992 IEEE ICASSP, 4; 1–4, 1992. The systems implementable on the basis of this approach differ through the different arrangement and implementation of the decorrelation filters. The disadvantage of this system is the use of relatively slow transversal (FIR) filter decorrelators which, as a result of their structure, cannot adapt particularly rapidly to the changing statistical characteristics of their input signals. The coefficients of both decorrelation filters are generally determined by the decorrelation of the output signal reaching the loudspeaker or receiver. This aims at making the convergence rate frequency-independent. Thus, there is no particular weighting of the frequencies particularly critical for the feedback behavior with high amplifications in the signal processing path.

SUMMARY OF THE INVENTION

The objective of the invention is to provide a circuit and a method for the adaptive suppression of an acoustic feedback, which do not suffer from the disadvantages of the known systems. In particular, with minimum expenditure, it is aimed at achieving an optimum convergence behaviour with minimum, inaudible distortions and without additional signal delay.

The present invention belongs to the group of systems with adaptive decorrelation filters. It makes use of the finding that lattice filter structures are particularly suitable for rapid decorrelation. Such lattice filter structures are known from speech signal processing and are used there for linear prediction. Algorithms for the decorrelation of a signal by means of lattice filters are known and can be gathered from the literature, cf. e.g. S. Thomas Alexander, "Adaptive Signal Processing", Springer-Verlag, New York, 1986.

The present invention models the feedback path and follows its time changes adaptively by means of an optimized tracking. The fedback signal components are continuously removed from the input signal. Thus, there is a considerable increase in the signal amplification permitted for stable operation. This allows the use of higher amplifications (e.g. with severe hearing impairments) or a pleasant, more open supply (e.g. for slight hearing impairments).

The circuit according to the invention is used in an acoustic system with at least one microphone for producing an electric input signal, at least one loudspeaker or receiver and an interposed electronic signal processing part. It includes a filter for modelling a feedback characteristic, an updating unit for calculating current coefficients for the filter, a subtracter for calculating an echo-compensated input signal by means of the subtraction of an echo estimate supplied by the filter from a digital input signal, a delay element for calculating a delayed output signal and two adaptive lattice decorrelation filters. A first lattice decorrelation filter serves to decorrelate the echo-compensated input signal, while a second lattice decorrelation filter decorrelates the delayed output signal by means of coefficients from the first lattice decorrelation filter. Both lattice decorrelation filters are configured for calculating their lattice coefficients by means of adaptive decorrelation of the echo-compensated input signal.

The first decorrelation filter, a lattice decorrelator, extracts from the echo-compensated signal the noise-like components contained therein. Parallel thereto in the second decorrelation filter, a lattice filter, with the coefficients from the lattice decorrelator the delayed output signal is converted into a transformed signal. The special point about this arrangement is the transposing of the lattice decorrelator and the lattice filter compared with the conventional arrangement, where it is not the echo-compensated signal, but the delayed output signal which is decorrelated. The circuit according to the invention has the major advantage that the spectral maxima present in the hearing correcting means remain in the transformed signal. These maxima usually correspond to the most critical frequencies or feedback and they are to be taken into account with a correspondingly high weighting during the updating of the filter coefficients.

In the case of the method according to the invention for the adaptive suppression of acoustic feedback, at least one microphone produces an electric input signal, a feedback characteristic is modelled with a filter, current coefficients for the filter are calculated with an updating unit, an echo-compensated input signal is calculated with a subtracter by substracting an echo estimate delivered by the filter from a digital input signal and a delayed output signal is calculated with a delay element. A first lattice decorrelation filter decorrelates the echo-compensated input signal and a second lattice decorrelation filter decorrelates the delayed output signal by means of coefficients from the first lattice decorrelation filter. The lattice coefficients of both lattice decorrelation filters are calculated by adaptive decorrelation of the echo-compensated input signal.

The present invention essentially differs from all hitherto published systems for suppression of acoustic feedback. The special arrangement and implementation of the blocks for decorrelation, as well as the normalization, control of the forget factor and step size factor, together with the possibility of a staggered updating are novel in the inventive combination. The present invention allows maximum convergence rates for minimum distortions, because the updating of the filter coefficients mainly takes place in the time spans and frequency ranges where the greatest amplifications occur in the hearing correcting means.

BRIEF FIGURE DESCRIPTION

The invention is described in greater detail hereinafter, compared with the prior art, relative to the attached block diagrams, wherein show:

FIG. 1 A general system for the adaptive suppression of acoustic feedback according to the prior art.

Figure 2:
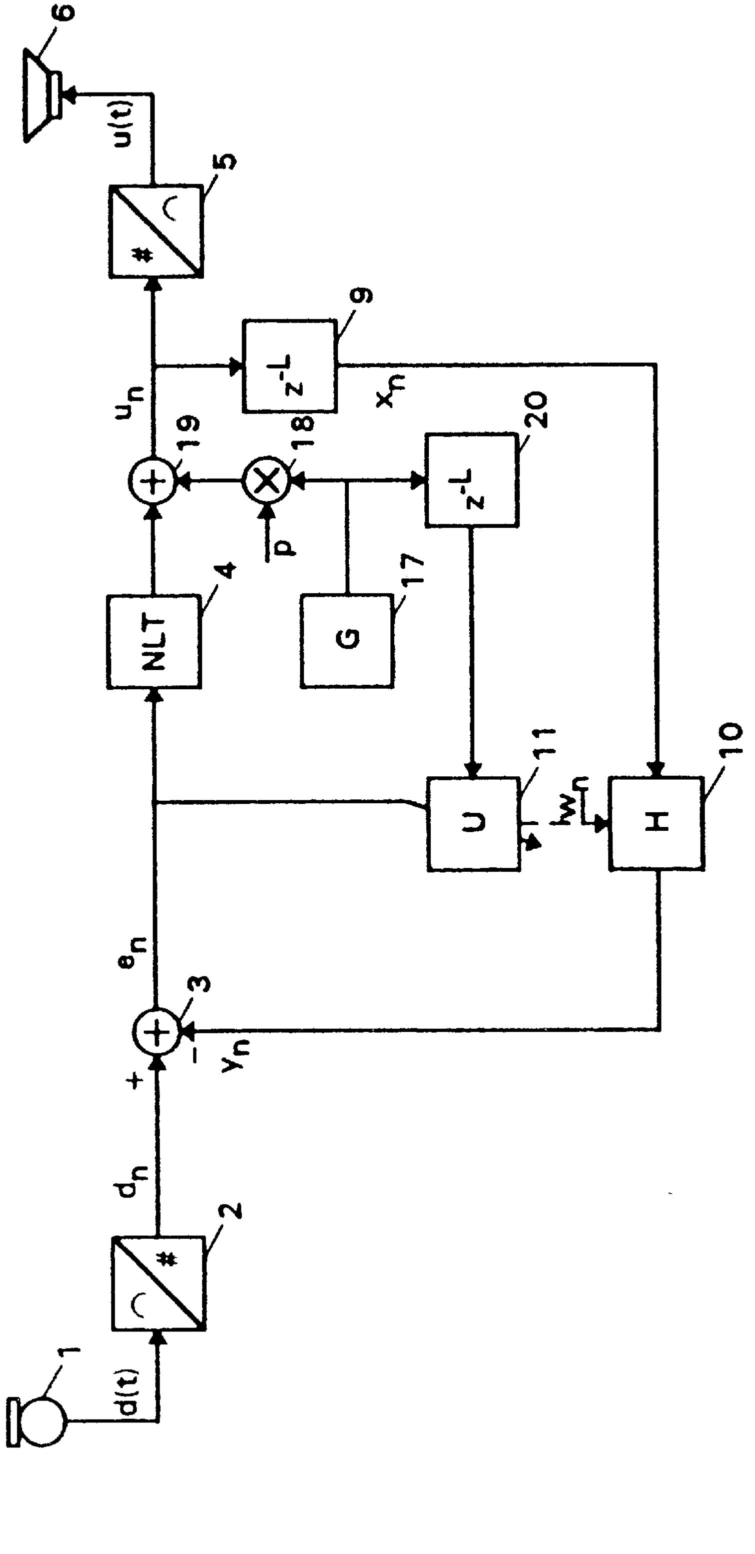
FIG. 2 PRIOR ART

FIG. 2 A prior art system using a noise signal.

Figure 3:
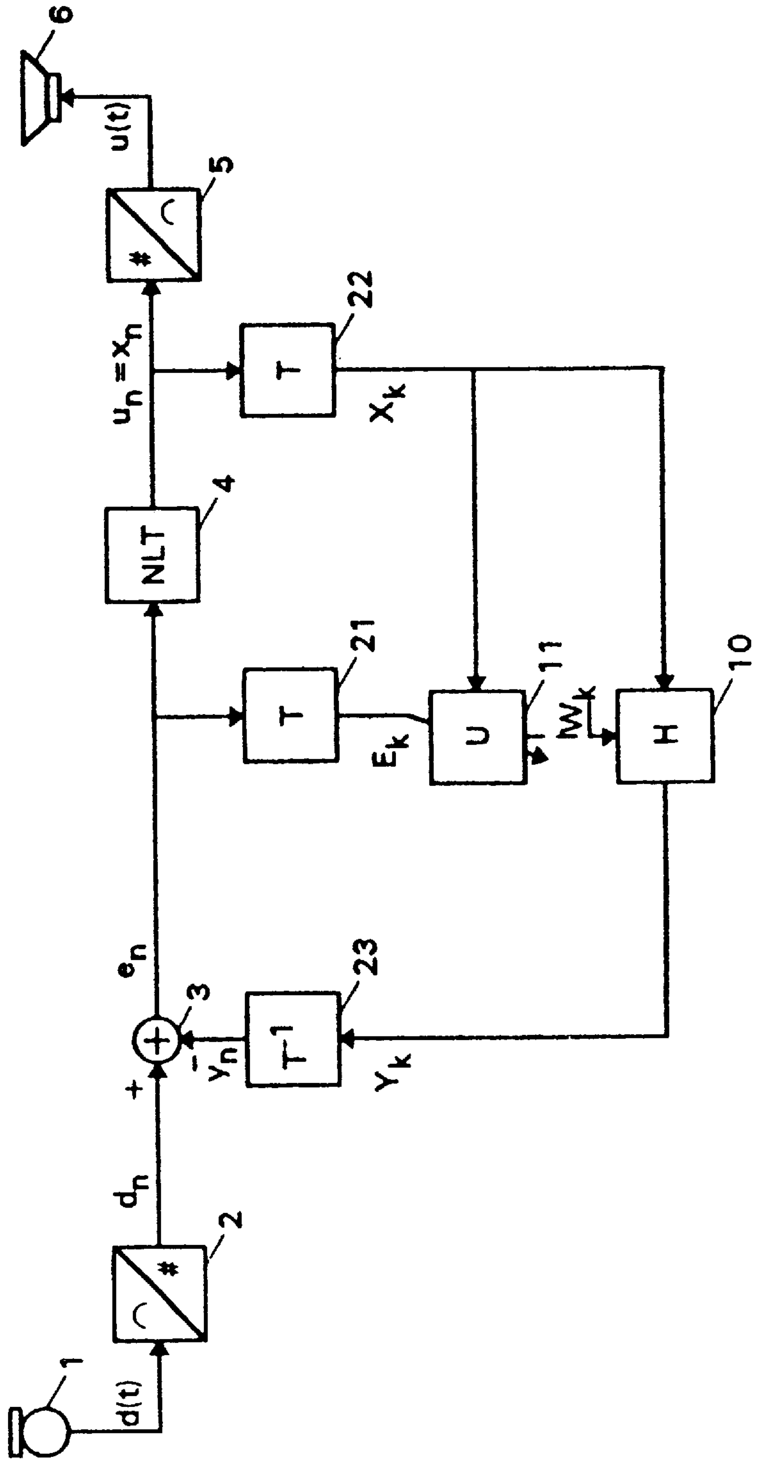
FIG. 3 PRIOR ART

FIG. 3 A prior art system using orthogonal transformations.

Figure 4:
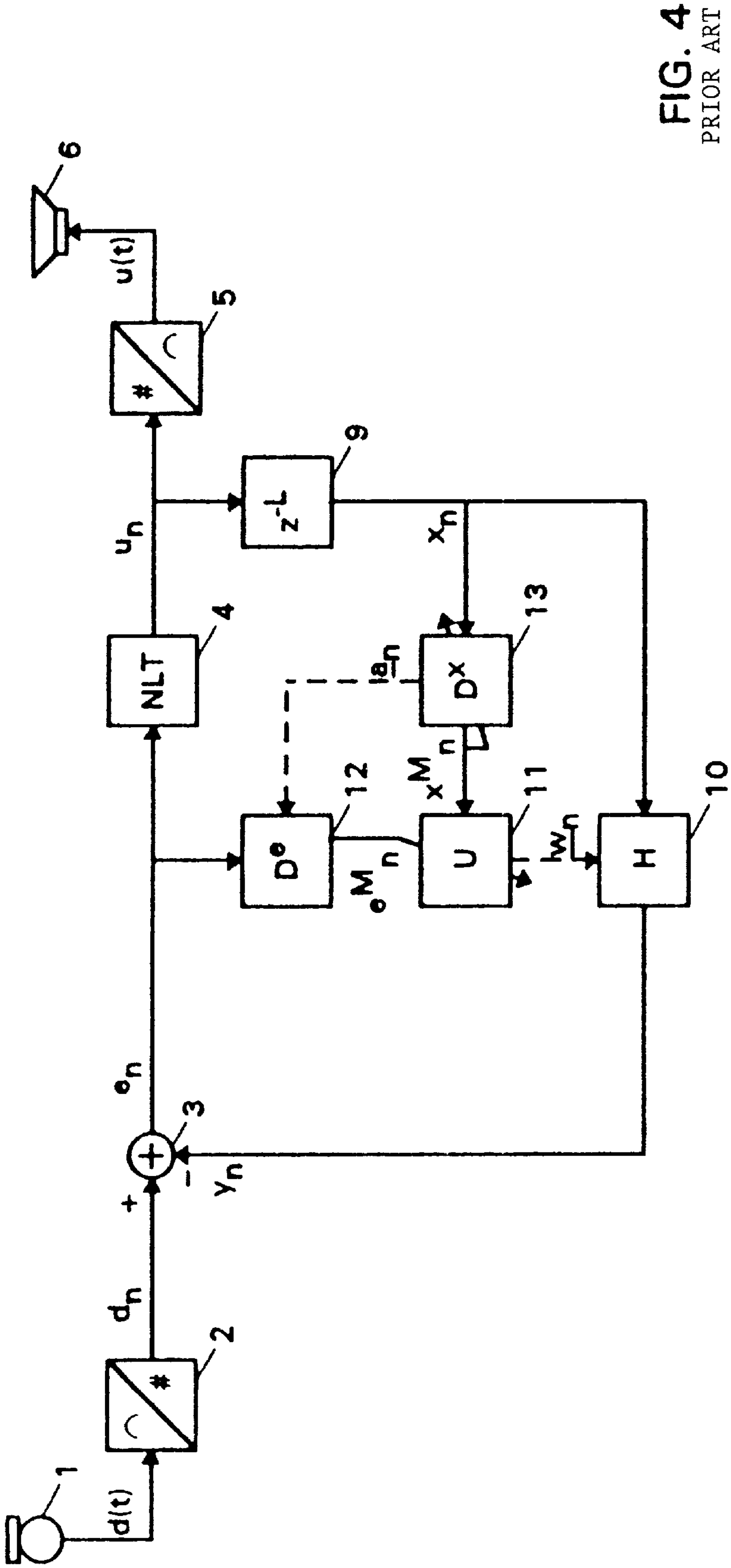
FIG. 4 PRIOR ART

FIG. 4 A prior art system using adaptive decorrelation filters.

Figure 5:
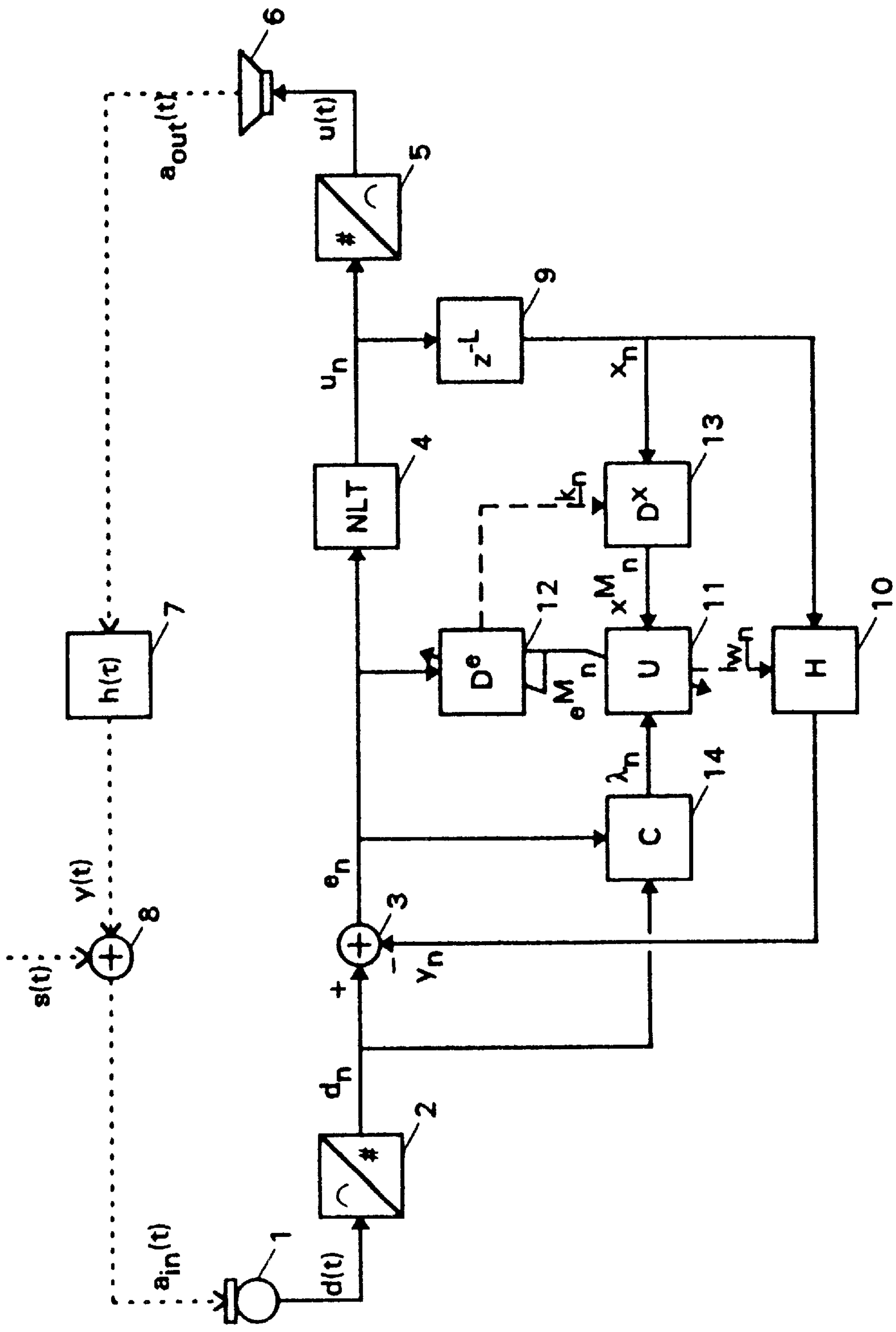

FIG. 5 The system according to the invention.

Figure 6:
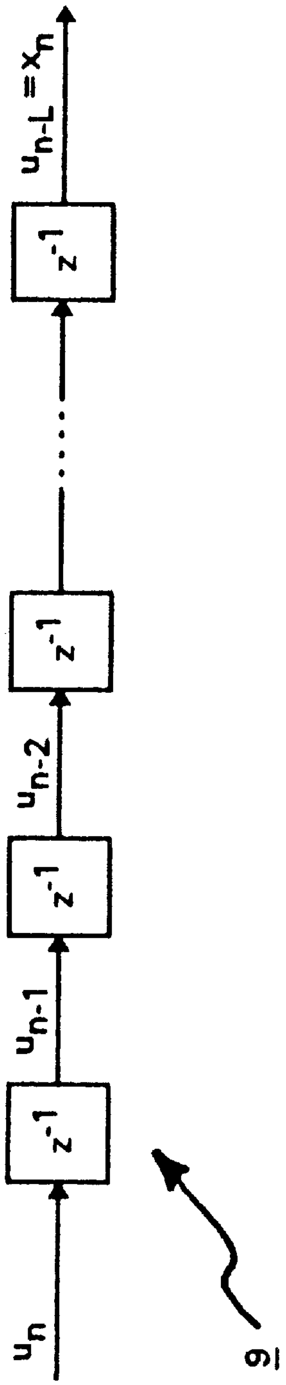

FIG. 6 A detailed drawing of a delay element of the system according to the invention.

Figure 7:
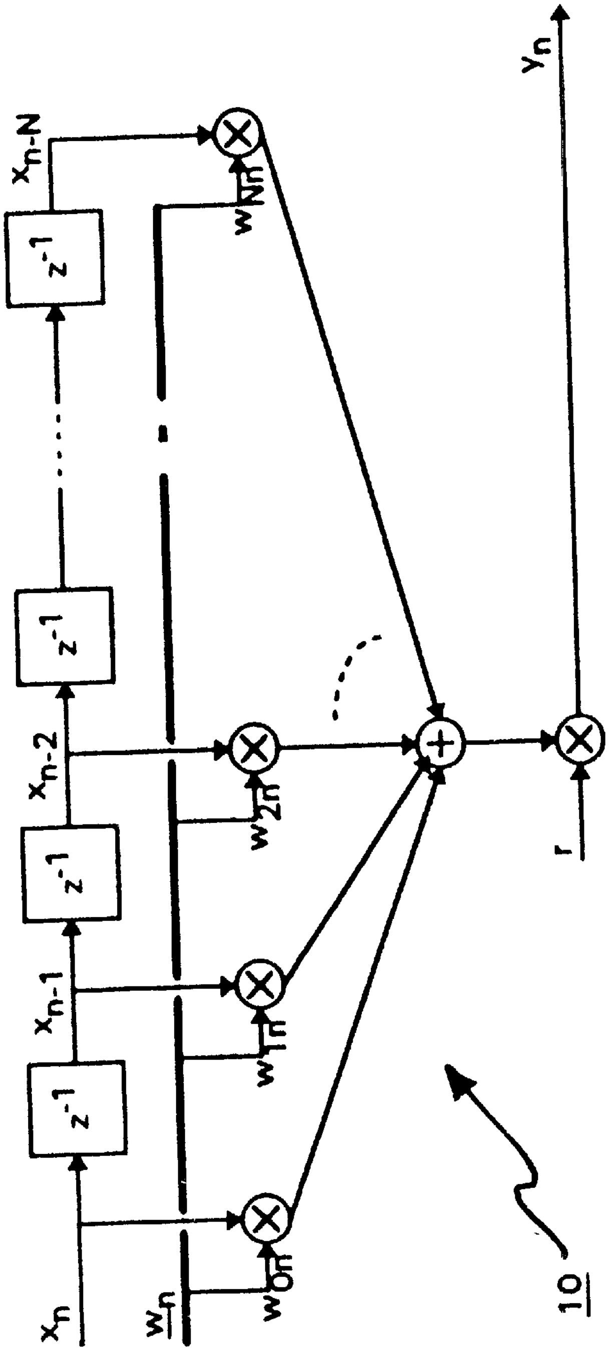

FIG. 7 A detail drawing of a filter of the inventive system.

Figure 8:
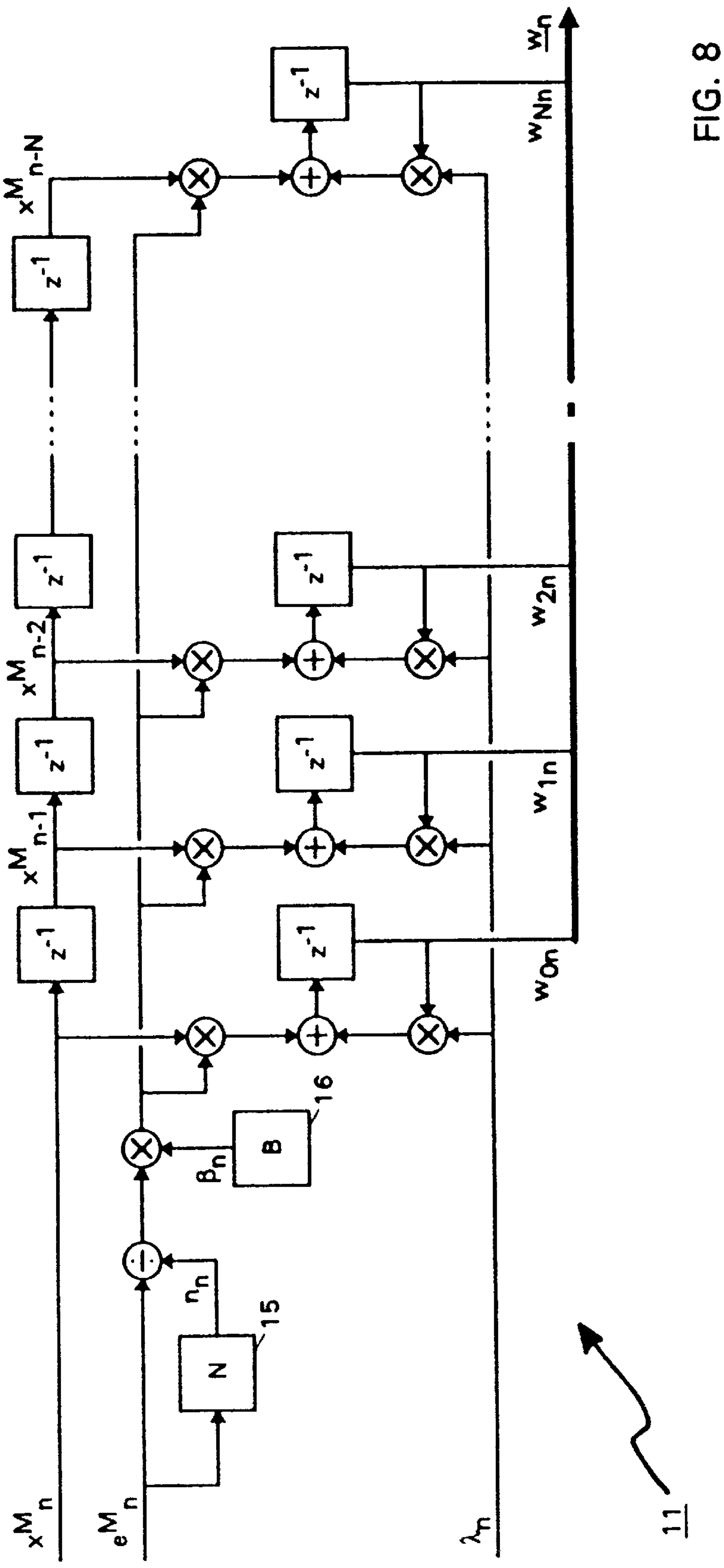

FIG. 8 A detail drawing of an updating unit of the inventive system.

Figure 9:
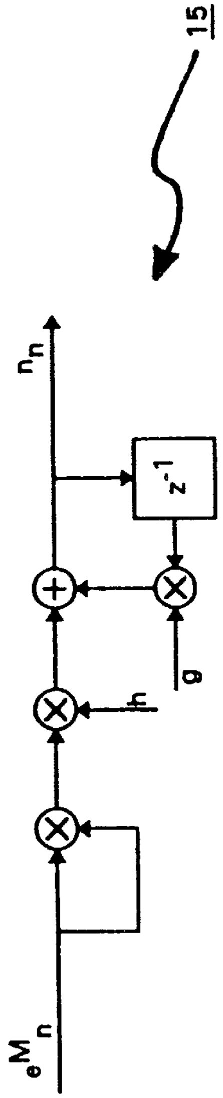

FIG. 9 A detail drawing of a normalization unit of the inventive system.

Figure 10:
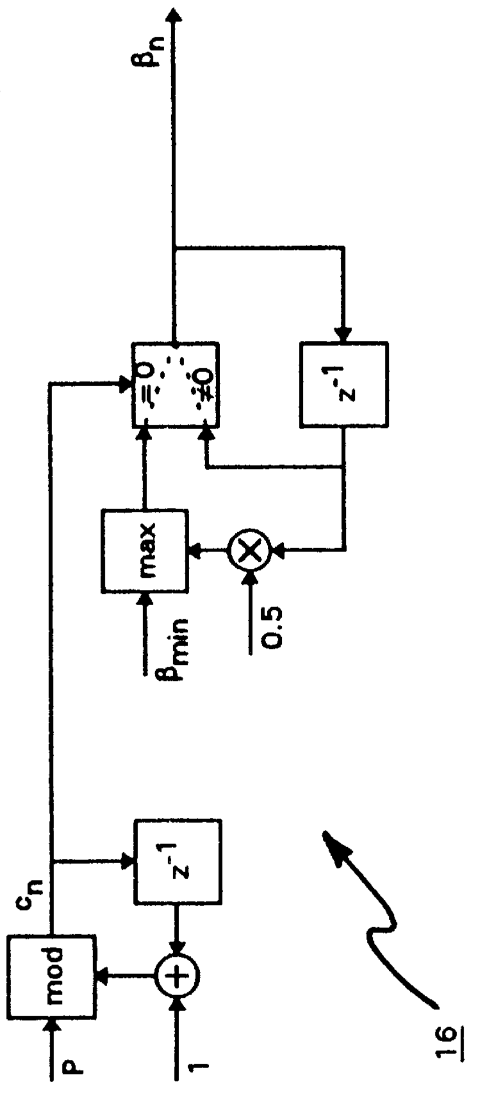

FIG. 10 A detail drawing of the speed control unit of the inventive system.

Figure 11:
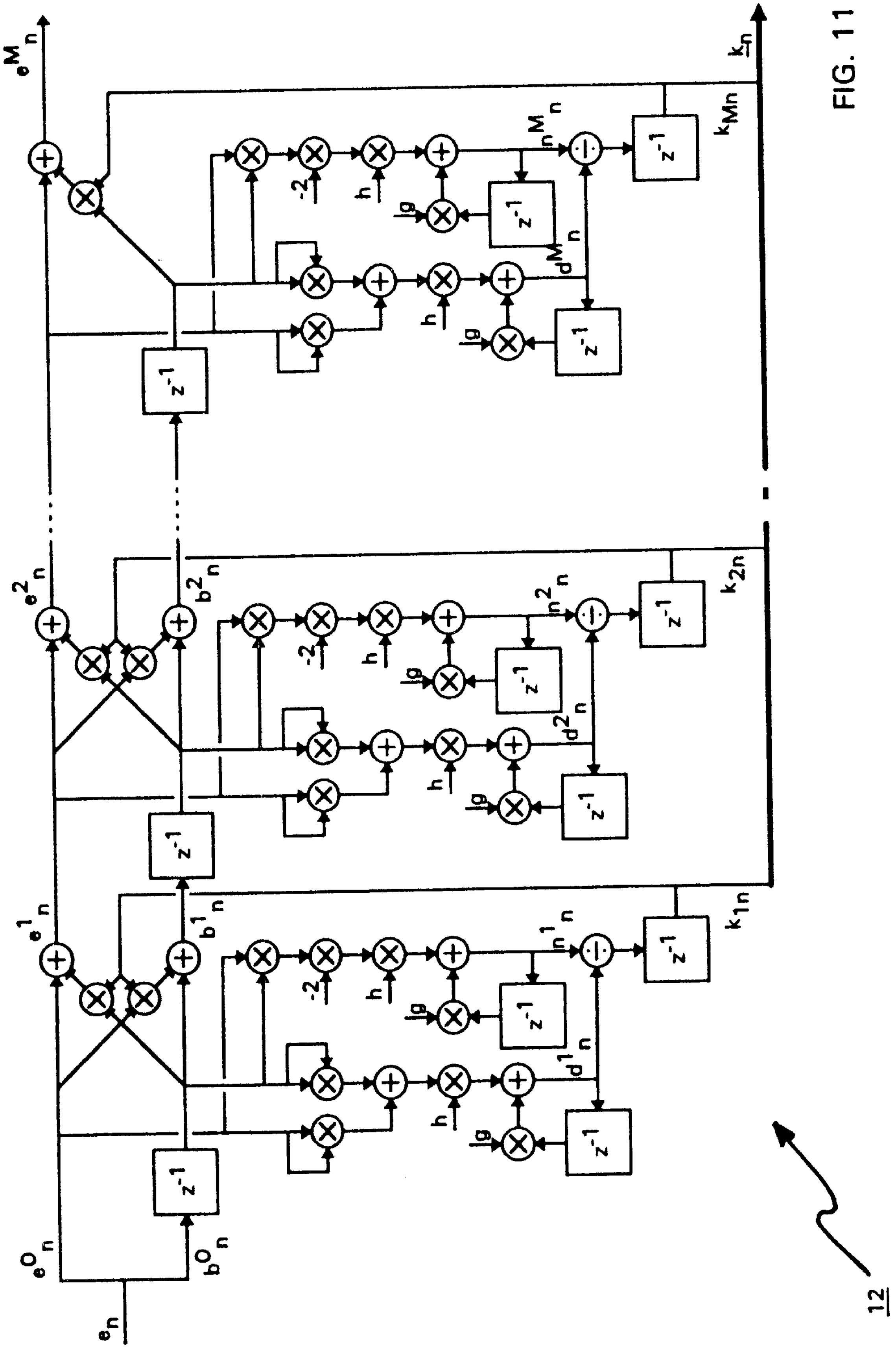

FIG. 11 A detail drawing of a lattice decorrelator of the inventive system.

Figure 12:
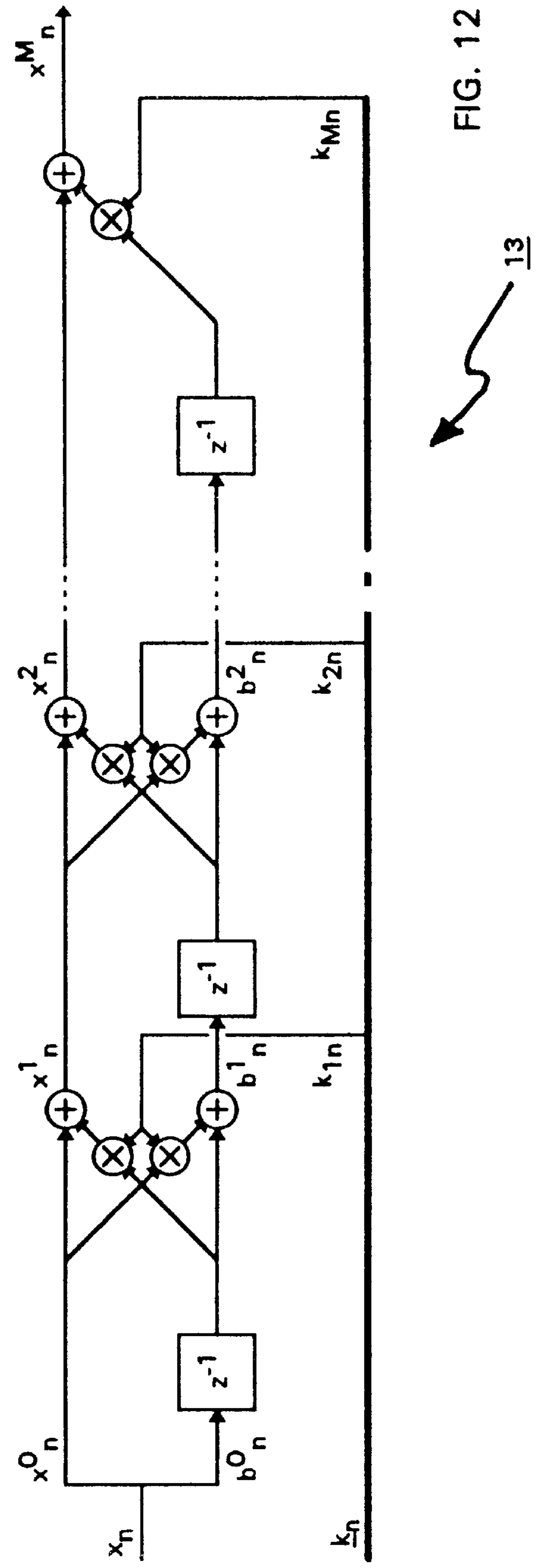

FIG. 12 A detail drawing of a lattice filter of the inventive system.

Figure 13:
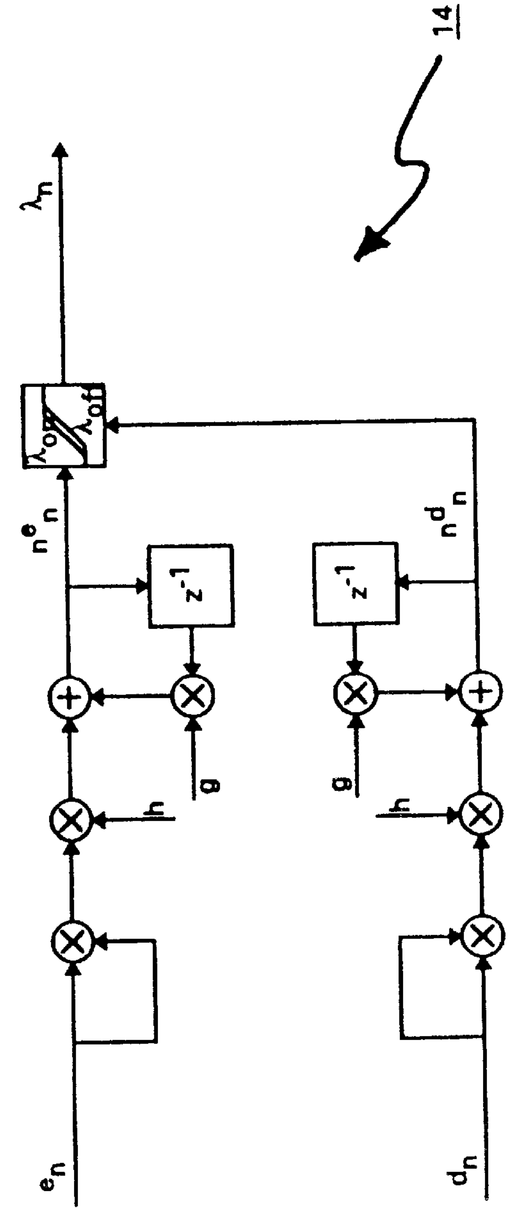

FIG. 13 A detail drawing of a control unit of the inventive system.

DETAILED DESCRIPTION

FIG. 1 shows a generally known system for the adaptive suppression of acoustic feedback. An acoustic input signal $a_{in}(t)$ is recorded by a microphone 1 and converted initially into an electric signal d(t). A following A/D converter 2 determines therefrom a digital input signal $d_n$ and an echo estimate $y_n$ is subtracted therefrom in a subtracter 3. The echo-compensated signal $e_n$ is transformed in a digital output signal $u_n$ by a hearing correcting means 4 adaptable to the particular use, e.g. an individual hearing correcting means for a person with impaired hearing. The D/A converter 5 carries out a conversion into an electric signal u(t), which is emitted as an acoustic output signal $a_{out}(t)$ by a loudspeaker or receiver 6. On its way back to the microphone 1, the acoustic output signal $a_{out}(t)$ is shaped to a signal y(t) in accordance with a feedback characteristic characterized by an impulse response $h(\tau)$ and is superimposed 8 on an acoustic signal s(t) from the outside. The remaining components in the system are a delay element 9, a filter 10 and an updating unit 11. The delay element 9 simulates the fixed delays contained in the system, which leads to a delayed signal $x_n$. The filter 10 models the unknown feedback characteristic. The actual coefficients $w_n$ for the filter are continuously calculated in the updating unit 11. Use is conventionally made of a variant of the LMS algorithm (Least Mean Square).

As a result of the not to be ignored autocorrelation function of real acoustic signals s(t), the generally known system is inadequate for obtaining a low distortion transmission, with at the same time a satisfactory convergence behaviour in a realistic environment. The system can be improved if the updating unit works with decorrelated signals.

FIG. 2 shows a system using an artificial noise signal for signal decorrelation. Such a system is e.g. known from the European patent applications EP-415 677, EP-634 084 and EP-671 114 and the aforementioned corresponding US patents of GN Danavox AS. The artificial noise signal is generated in a noise generator and is added (19) to the digital output signal $u_n$, via a power control unit 18. The artificial noise signal is also supplied by means of a delay element 20 to the updating unit 11. The noise signal is either only connected in when required in place of the output signal $u_n$ or is continuously added to the output signal $u_n$.

FIG. 3 shows a system using fixed, orthogonal transformations for signal decorrelation purposes. Such a system of Phonak AG was e.g. published as European patent application EP-585 976 and U.S. Pat. No. 5,661,814. The echo-compensated signal $e_n$ and the output signal $u_n$ are transformed by means of transformation units 21 and 22 into the frequency domain or the echo estimate $y_n$ is recovered by means of an inverse transformation 23. In such systems, filtering and updating of the coefficients do not take place directly in the time domain.

FIG. 4 shows a system using adaptive decorrelation filters 12, 13 for decorrelating the signals. Such a system was e.g. described by Mamadou Mboup et al, "Coupled Adaptive Prediction and System Identification: A Statistical Model and Transient Analysis", Proc. 1992 IEEE ICASSP, 4; 1–4, 1992. The echo-compensated signal $e_n$ and the delayed output signal $x_n$ are decorrelated by the adaptive decorrelation filters 12, 13. The coefficients $k_n$ of the two decorrelation filters 12, 13 are calculated in the block 13 by means of decorrelating the delayed output signal $x_n$.

An embodiment of the inventive system is shown in FIG. 5. Apart from the above-described blocks 1 to 11, the system according to the invention uses adaptive lattice decorrelation filters, namely a lattice decorrelator 12 and a lattice filter 13 parallel thereto. The lattice filter structures known from speech signal processing have proved particularly suitable for rapid decorrelation. They are used there for linear prediction. Algorithms for the decorrelation of a signal by means of lattice filters are known.

The lattice decorrelator 12 extracts from the echo-compensated signal $e_n$ noise-like components $e^M_n$ contained therein. Parallel thereto in the lattice filter 13 with coefficients $k_n$ from the lattice decorrelator 12 the delayed output signal $x_n$ is converted into a transformed signal $x^M_n$. The special feature of this arrangement is the transposing of the two adaptive decorrelation filters 12 and 13 when compared with the conventional procedure, in which it is not the echo-compensated signal $e_n$, but the delayed signal $x_n$ which is decorrelated. However, the arrangement according to the invention has the major advantage that the spectral maxima in the hearing correcting means 4 are maintained in the transformed signal $x^M_n$. These maxima generally correspond to the most critical frequencies for feedback and are to be taken into account with a correspondingly high weighting when updating the filter coefficients $w_n$.

The order of the two lattice decorrelation filters 12, 13 results from a compromise between the desired degree of decorrelation and the computing expenditure associated therewith. For the specific case of second order filters (M=2) by means of an upper limiting of the second lattice coefficient $k_{2n}$, once again a considerable improvement to the system behaviour is obtained. This upper limit of the second lattice coefficient leads to pure sinusoidal sounds not being completely decorrelated. This in turn has the major advantage that the whistling sounds occurring with unstable operation are much more rapidly compensated.

The system according to the invention also contains a control unit 14, which continuously compares the power of the input signal $d_n$ with the power of the echo-compensated signal $e_n$. The ratio of the two powers determines which forget factor $\lambda_n$ is used in the updating unit 11. Thus, if the power of the echo-compensated signal is higher than that of the input signal, this almost always indicates that the echo estimate $y_n$ and consequently the coefficients $w_n$ of the filter 10 are too high. By setting $\lambda_n<1$ the coefficients rapidly converge towards a more suitable value. However, in normal operation $\lambda_n$–1 is set. The described control of the forget factor $\lambda_n$ supplies an improved convergence behaviour in the case of rapid changes to the feedback path. An internal feedback temporarily produced by the system is immediately detected and very rapidly adapted again to the external feedback path.

A further difference compared with other systems results from the fact that the updating unit 11 contains a normalization unit 15 and a speed control unit 16. The arrangement of the subsequently described blocks can be gathered from FIG. 8, which represents a definition of the updating unit 11. The normalization unit 15 permits the application of the NLMS algorithm (Normalized Least Mean Square). It calculates the power of the signal $e^M_n$. The special nature of this arrangement results from the fact that normalization takes place with respect to $e^M_n$ and not, as is usually the case, with respect to $x^M_n$. Thus, the convergence speed or rate is dependent on the ratio of the powers of $x^M_n$ and $e^M_n$. This ratio is essentially given by the amplification contained in the hearing correcting means 4. The amplification in the hearing correcting means is in the general, nonlinear case (e.g. compression process) not time-constant. Thus, in the method according to the invention the convergence behaviour of the adaptive filter 10 modelling the feedback characteristics 7 is dependent on the time behaviour of the hearing correcting means 4, i.e. on the time variation of its amplification and frequency response. In high amplification times with a particularly critical feedback behaviour, there is a rapid adaptation of the coefficient $w_n$ and in low amplification times with an uncritical feedback behaviour, there is a correspondingly slower adaptation. Thus, updating mainly takes place during the times where it is necessary. This procedure combines a rapid convergence in the critical case with an almost distortion-free processing in the uncritical case.

The speed control unit 16 supplies a step size factor $\beta_n$ for the NLMS algorithm. The speed control unit 16 supplies values for $\beta_n$ beginning with a starting value $\beta_{max}$ and within the first few seconds after starting decreasing stepwise to the end value $\beta_{min}$. Following starting, this procedure permits a very rapid convergence of the filter coefficients $w_n$ from zero to their desired values. The resulting initial signal distortions are less serious than the much longer lasting feedback whistling which would otherwise occur.

Therefore the updating unit 11 can be designed in such a way that at each discrete time only a specific, small, cyclically changing part of the (N+1) filter coefficients is updated, which considerably reduces the computing expenditure. The system is not made slower than is necessary for preventing audible distortions.

An embodiment of the invention is described in greater detail hereinafter relative to FIG. 5. The microphone 1, A/D converter 2, D/A converter 5 and receiver 6 are assumed as ideal. The characteristics of the real acoustic and electric converters can be considered as part of the feedback characteristic 7. The same relationships apply for the A/D converter 2 and the D/A converter 5. T and $f_s$ represent the sampling period and sampling frequency and n represents the discrete time:

$$d_n=d(n.T)\quad u(n.T)=u_n$$

$$T=1/f_s\quad f_s=16\text{ kHz}$$

The following relationships apply to the subtracter 3 and the hearing correcting means 4. The function f( ) stands for any nonlinear function of its arguments. It is based on the selected method for correcting the individual hearing loss:

$$e_n=d_n-y_n$$

$$u_n=f(e_o,e_1,e_2,\ldots,e_n)$$

The acoustic transmission path is modelled by means of the feedback characteristic 7 and an adder 8. The operator * is to be understood as a convolution operator and $h(\tau)$ stands for the impulse response of the feedback. The signal from the outside is designated s(t):

$$y(t)={}_{aout}(t)*h(\tau)$$

$$a_{in}(t)=s(t)+y(t)$$

The delay element 9 is shown in FIG. 6 and the following relations apply. The delay length L must be matched to the sum of the delays of the acoustic and electric converters:

$$x_n=u_{n-L}$$

$$L=16\ldots 24\ (L\cdot T=1\text{ ms}\ldots 1.5\text{ ms})$$

The filter 10 is shown in FIG. 7 and the following relations apply. The underlined quantities signify the similar elements combined to vectors.

The factor r permits a choice of range, so that the filter coefficients can be kept continuously in the range $-1<w_{kn}<1$ independently of the hearing correcting means 4. The filter order N must be matched to the length of the impulse response h(τ):

$$y_n = r\cdot \underline{w}_n^T\cdot \underline{x}_n = r\cdot\sum_{k=0}^{N} w_{k,n}\cdot x_{n-k}$$

$$r = 1/128,\ 1/64,\ 1/32,\ 1/16,\ 1/8,\ 1/4,\ 1/2,\ 1/1$$

$$N = 32\ \cdots\ 64\quad (N\cdot T = 2\text{ ms}\ \cdots\ 4\text{ ms})$$

The updating unit 11 is shown in FIG. 8 and the following relations apply. The formula is given in vector notation and in elementary notation:

$$\underline{w}_{n+1} = \lambda_n\cdot\underline{w}_n + \beta_n\cdot\frac{e_n^M}{n_n}\cdot\underline{x}_n^M$$

$$w_{k,n+1} = \lambda_n\cdot w_{k,n} + \beta_n\cdot\frac{e_n^M}{n_n}\cdot x_{n-k}^M$$

$$(0\le k\le N)$$

In the preferred embodiment all (N+1) filter coefficients are not simultaneously updated and instead only K. The following relations apply under the assumption that K is an integral divider of (N+1). The variable $c_n$ is used as a count variable:

$$k = K\cdot\text{int}\left(\frac{c_{n-1}}{K}\right),\ \cdots\ ,\ K\cdot\text{int}\left(\frac{c_{n-1}}{K}\right)+K-1$$

$$c_n = (c_{n-1}+2)\text{mod}(N+1)$$

$$N = 47$$

$$K = 4$$

In turn, the updating unit 11 contains the normalization unit 15 and the speed control unit 16. The normalization unit 15 is shown in FIG. 9 and the following relations apply. The coefficients g and h determine the length of the time interval over which the averaging of the power of $e^M_n$ takes place:

$$n_n=g\cdot n_{n-1}+h\cdot(e_n^M)^2$$

$$g=63/64\quad h=1-g=1/64$$

The speed control unit 16 is shown in FIG. 10 and the following relations apply. The step size factor $\beta_n$ is reduced stepwise by the factor 0.5 to $\beta_{min}$, starting from $\beta_{max}$. The optimum values for $\beta_{max}$ and $\beta_{min}$ are dependent on the individual hearing correcting means 4. The variable $c_n$ is used as a count variable:

$$\beta_{-1} = \beta_{\max}$$

$$\beta_n = \begin{cases} \beta_{n-1} & (c_n\ne 0)\\ \max(0.5\cdot\beta_{n-1},\ \beta_{\min}) & (c_n = 0)\end{cases}$$

$$c_n = (c_{n-1}+1)\text{mod}P$$

$$P = 4096$$

$$(P\cdot T = 256\text{ ms})$$

The lattice decorrelator 12 is shown in FIG. 11 and the following relations apply. Apart from the recursion formulas for the calculation of $e^i_n$ and $b^i_n$, at each step it is also necessary to determine the quantities $d^i_n$ and $n^i_n$ for the tracking of the coefficients $k_{in}$. The filter order M results from a compromise between the desired degree of decorrelation and the necessary computing expenditure:

$$e_n^0 = e_n$$

$$b_n^0 = e_n$$

$$\left.\begin{aligned} e_n^i &= e_n^{i-1} + k_{i,n}\cdot b_{n-1}^{i-1}\\ b_n^i &= k_{i,n}\cdot e_n^{i-1} + b_{n-1}^{i-1}\\ d_n^i &= g\cdot d_{n-1}^i + h\cdot\left[(e_n^{i-1})^2 + (b_{n-1}^{i-1})^2\right]\\ n_n^i &= g\cdot n_{n-1}^i + h\cdot[(-2)\cdot e_n^{i-1}\cdot b_{n-1}^{i-1}]\\ k_{i,n+1} &= \frac{n_n^i}{d_n^i}\end{aligned}\right\}(1\le i\le M)$$

$$g = 63/64\qquad h = 1-g = 1/64$$

$$M = 2\ \cdots\ 8$$

In the preferred embodiment with the filter order M=2, a complete decorrelation is prevented by the limitation of the second coefficient $k_{2n}$ and the following relations apply:

$$k_{2,n}=\min(k_{2,n},\ k_{max})$$

$$k_{max}=0.921875$$

The lattice filter 13 is shown in FIG. 12 and the following relations apply:

$$x_n^0 = x_n$$

$$b_n^0 = x_n$$

$$\left.\begin{aligned} x_n^i &= x_n^{i-1} + k_{i,n}\cdot b_{n-1}^{i-1}\\ b_n^i &= k_{i,n}\cdot x_n^{i-1} + b_{n-1}^{i-1}\end{aligned}\right\}(1\le i\le M)$$

The control unit 14 is shown in FIG. 13 and the following relations apply. The forget factor $\lambda_n$ results from the ratio of the two powers $n^d_n$ and $n^e_n$. In the middle range a hysteresis is present:

$$n_n^d = g\cdot n_{n-1}^d + h\cdot(d_n)^2$$

$$n_n^e = g\cdot n_{n-1}^e + h\cdot(e_n)^2$$

-continued $$\lambda_n = \begin{cases} \lambda_{off} & (n_n^e \le n_n^d) \\ \lambda_{n-1} & (n_n^d < n_n^e \le 2 \cdot n_n^d) \\ \lambda_{on} & (n_n^e > 2 \cdot n_n^d) \end{cases}$$

$$g = 63/64 \quad h = 1 - g = 1/64$$

$$\lambda_{off} = 1.0 \quad \lambda_{on} = 0.99 \cdots 0.9999$$

The preferred embodiment can be programmed without any problems on a commercial signal processor (DSP) or implemented in an integrated circuit. All the variables must be suitably quantized and the operations optimized to the existing architecture blocks.

What is claimed is:

1. Circuit for the adaptive suppression of acoustic feedback in an acoustic system having at least one microphone (1) for producing an electric input signal ($d_t$)), at least one loudspeaker or receiver (6) and an interposed electronic signal processing part, incorporating a filter (10) for modelling a feedback characteristic (7), an updating unit (11) for calculating current coefficients ($w_n$) for the filter (10), a subtracter (3) for calculating an echo-compensated input signal ($e_n$) by subtracting an echo estimate ($y_n$) delivered by the filter (10) from a digital input signal ($d_n$), a delay element (9) for calculating a delayed output signal ($x_n$), a first adaptive decorrelation filter (12) and a second adaptive decorrelation filter (13), characterized in that the two decorrelation filters (12, 13) are constructed as lattice decorrelation filters, that the first decorrelation filter (12) is provided for decorrelating the echo-compensated input signal ($e_n$) and the second decorrelation filter (13) for decorrelating the delayed output signal ($x_n$) by means of coefficients ($k_n$) from the first decorrelation filter (12), and that the two decorrelation filters (12, 13) are configured for calculating their lattice coefficients ($k_n$) by adaptive decorrelation of the echo-compensated input signal ($e_n$).

2. Circuit according to claim 1, further comprising a normalization unit (15) in the updating unit (11) for the normalization of a decorrelated, echo-compensated input signal ($e^M{}_n$) delivered by the first decorrelation filter (12).

3. Circuit according to claim 1, further comprising a control unit (14) for monitoring the ratio of the powers of the digital input signal ($d_n$) and the echo-compensated input signal ($e_n$) and for controlling a forget factor ($\lambda_n$) in the updating unit (11).

4. Circuit according to claim 1, further comprising a speed control unit (16) for calculating a step size factor $\beta_n$ in the updating unit (11).

5. Method for the adaptive suppression of acoustic feedback in a circuit wherein an electric input signal (d(t)) is produced by at least one microphone (1), a feedback characteristic (7) is modelled by a filter (10), current coefficients ($w_n$) for the filter (10) are calculated by an updating unit (11), an echo-compensated input signal ($e_n$) is calculated by a subtracter (3) by subtraction of an echo estimate ($y_n$) delivered by the filter (10) from a digital input signal ($d_n$) and a delayed output signal ($x_n$) is calculated with a delay element (9), characterized in that the echo-compensated input signal ($e_n$) is decorrelated with a first lattice decorrelation filter (12) and the delayed output signal ($x_n$) is decorrelated by a second lattice decorrelation filter (13) by using coefficients ($k_n$) from the first lattice decorrelation filter (12), and that the lattice coefficients ($k_n$) of the two decorrelation filters (12, 13) are calculated by the adaptive decorrelation of the echo-compensated input signal ($e_n$).

6. Method according to claim 5, further comprising the step of normalizing a decorrelated, echo-compensated input signal ($e^M{}_n$) delivered by the first decorrelation filter (12) in the updating unit (11).

7. Method according to claim 6, further comprising updating during each execution cycle, in said updating unit (11), only a small, cyclically changing portion of said coefficients ($w_n$) of said filter (10) which models said feedback coefficient.

8. Method according to claim 6, further comprising the step of monitoring, in a control unit (14), the ratio of the powers of the digital input signal ($d_n$) and of the echo-compensated input signal ($e_n$) and controlling a forget factor ($\lambda_n$) in the updating unit.

9. Method according to claim 5, further comprising the step of monitoring, in a control unit (14), the ratio of the powers of the digital input signal ($d_n$) and of the echo-compensated input signal ($e_n$) and controlling a forget factor ($\lambda_n$) in the updating unit.

10. Method according to claim 9, further comprising updating during each execution cycle, in said updating unit (11), only a small, cyclically changing portion of said coefficients ($w_n$) of said filter (10) which models said feedback coefficient.

11. Method according to claim 5, characterized in that in the updating unit (11) a step size factor $\beta_n$ is reduced stepwise from a starting value following the starting up of the hearing aid until an optimum operating value is reached.

12. Method according to claim 11, further comprising updating during each execution cycle, in said updating unit (11), only a small, cyclically changing portion of said coefficients ($w_n$) of said filter (10) which models said feedback coefficient.

13. Method according to claim 5, characterized in that second order lattice decorrelation filters (12, 13) are used and there is an upper limitation to the second lattice coefficient $k_{2n}$.

14. Method according to claim 13, further comprising updating during each execution cycle, in said updating unit (11), only a small, cyclically changing portion of said coefficients ($w_n$) of said filter (10) which models said feedback coefficient.

15. Method according to claim 5, further comprising updating during each execution cycle, in said updating unit (11), only a small, cyclically changing portion of said coefficients ($w_n$) of said filter (10) which models said feedback coefficient.

* * * * *